Feb. 5, 1952 J. H. McDONALD ET AL 2,584,483
RELIEVING FIXTURE

Filed Jan. 31, 1948 3 Sheets-Sheet 1

INVENTORS.
John H. McDonald
& John Novak
By Thiess, Olson & Mecklenburger
Attys.

Feb. 5, 1952  J. H. McDONALD ET AL  2,584,483
RELIEVING FIXTURE
Filed Jan. 31, 1948  3 Sheets-Sheet 3

INVENTORS.
John H. McDonald
& John Novak.

Patented Feb. 5, 1952

2,584,483

UNITED STATES PATENT OFFICE 2,584,483

RELIEVING FIXTURE

John H. McDonald and John Novak, Chicago, Ill., assignors, by mesne assignments, to Glenbard Tool Mfrs., Chicago, Ill., a copartnership Application January 31, 1948, Serial No. 5,577

7 Claims. (Cl. 51—219)

The present invention relates to a machine fixture and has special reference to a work supporting fixture for use with a machine such as a grinding machine.

More particularly, this invention relates to a relieving fixture suitable for supporting tools and implements such as reamers, drills, counterbores, cutters, hollow mills, trepan tools, etc., and moving them during grinding or other treatment in such manner as to provide radial, or longitudinal and radial, relief during the operation.

The fixture may comprise a work supporting head mounted on a base for both longitudinal movement and pivotal or rocking movement about a longitudinal axis. The head is provided with supporting structure including a spindle for supporting a tool or implement and causing it to rotate with the spindle which may be driven by any suitable means. Actuating mechanism is provided for producing longitudinal reciprocation of the head and the implement carried thereby in timed relation with the rotation of the spindle, and additional means are employed for causing pivotal movement of the head during its longitudinal movement and in timed relation therewith. Separate, independently adjustable means are provided for varying both the longitudinal and pivotal movements of the head. Thus, the fixture can be adjusted to provide the exact longitudinal and radial relief desired for any particular work. When radial relief alone is desired, mechanism effecting pivotal movement of the head cooperates with the spindle in timed relation to the rotation thereof.

An object of the present invention is to provide a fixture for use with a grinder or other machine tool for supporting and guiding the work with respect to the tool in such manner as to provide radial, or longitudinal and radial, relief.

Another object is to provide such a fixture having independently adjustable means for controlling the longitudinal movement and independently adjustable means for controlling the pivotal movement of the head.

Still another object is to provide a fixture of the type above referred to which is simple in construction and may be readily adjusted and operated.

Further objects and advantages will be apparent from the following description and claims when considered with the accompanying drawings in which:

Fig. 6 is a cross sectional view taken along the lines 6—6 of Fig. 3;

Fig. 7 is a side elevational view of a modified form of driving means for effecting pivotal movement of the head, and Fig. 8 is an end elevational view of the modification shown in Fig. 7.

Figure 1:
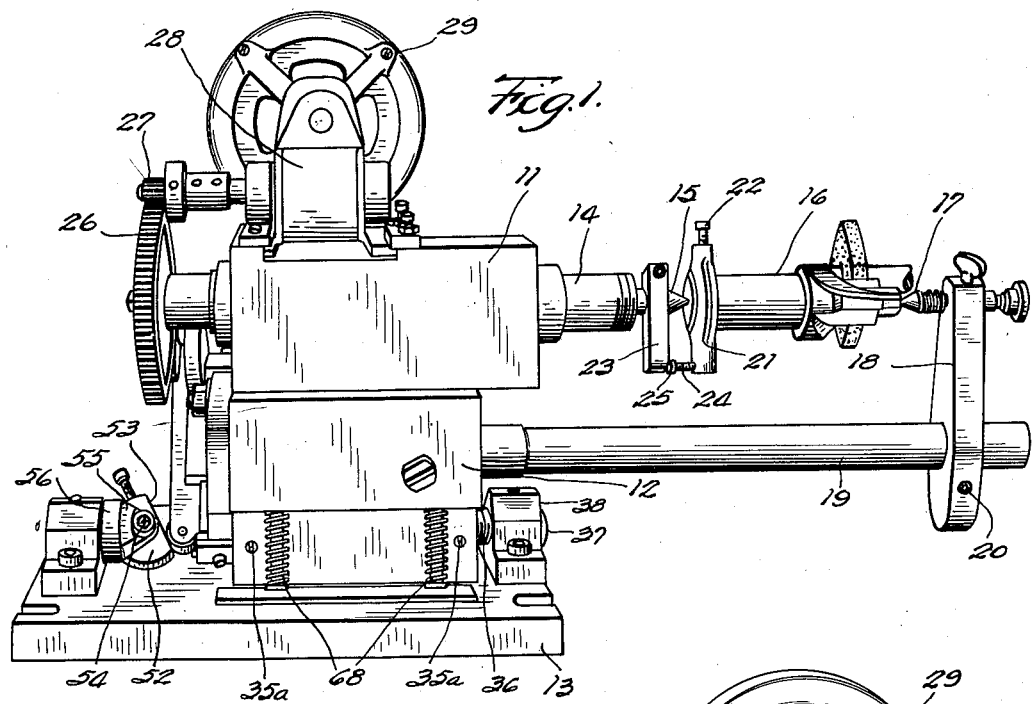
Fig. 1 is a front perspective view of a fixture embodying the present invention.

Referring more particularly to the drawings, there is shown a fixture embodying the present invention positioned for supporting work during treatment by the grinding wheel of a grinding machine. The fixture comprises a head 11 having a main body portion 12 mounted on a base 13. Rotatably mounted in the head 11 is a spindle 14 having at one end a live center 15 for engaging one end of a tool such as the stepped reamer 16, illustrated in the drawings. The opposite end of the reamer is supported by the tail stock center 17 mounted on the tail stock 18 which in turn is supported on the bar 19 extending from the main body portion 12. The tail stock 18 is arranged for longitudinal adjustment along the bar 19. A set screw 20 serves to hold the tail stock in desired position on the bar 19. A dog 21, held on the inner end of the tool 16 by a set screw 22, is driven by a driver 23 mounted on the live center 15. An adjustable screw 24 on the driver engages the driver with the dog 21. The screw 24 is held in position by a lock nut 25. In this manner, the tool 16 is caused to rotate with the spindle 14. The opposite end of the spindle is provided with a gear 26 in mesh with a gear 27 of the speed reducer 28 driven by a motor 29.

The head 11 and the main body portion 12 are mounted on the base 13 for both longitudinal and pivotal movement about an axis longitudinal of the head. To accomplish this the base 13 is provided with a bracket 30 having a longitudinal opening therein, the bracket being secured to the base 13 by any suitable means such as bolts 31. Mounted in the bracket 30 is a tubular bronze bearing 32 in which is positioned a cylindrical shaft 33 having a reduced end portion 34.

At the bottom of the main body portion 12 of the head 11 there are two spaced bearing portions 35 having aligned openings therethrough for receiving the shaft 33. The space between the bearing portions 35 is sufficient to accommodate the bracket 30 therebetween. It is to be noted that when the body portion 12 is mounted on the shaft 33, the bottom of the body portion is spaced above the surface of the base to permit the body portion to pivot about the shaft 33 on the base 30.

Figure 4:
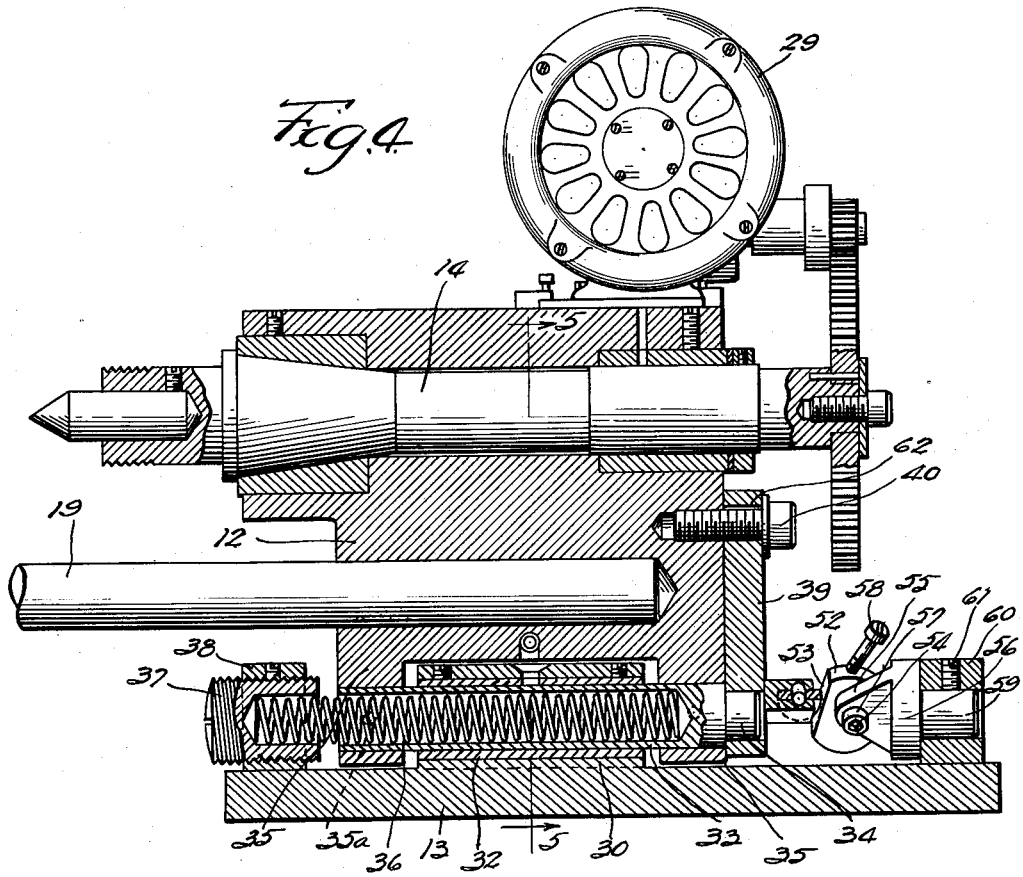
Fig. 4 is a cross sectional view taken on the lines 4—4 of Fig. 3.

A spring 36 is positioned in the hollow shaft 33, one end being positioned by the closed, reduced end of the shaft and the other end of the spring being held under tension by the screw cup 37 threaded into the pillow block 38 bolted to the base 13. The closed end of the hollow shaft 33 is held in place against the action of the spring 36 by set screws 35a in bearing portions 35. The gear plate 39 is fastened to the end of the body portion 12 by a screw 40. The spring 36 tends to move the body portion 12 away from the pillow block 38 toward the right, as viewed in Fig. 4.

The mechanism for providing longitudinal movement of the body portion 12 and the head 11 will now be described. This comprises a slide 41 mounted in guides 42 secured to the outer face of the gear plate 39. The guides 42 are mounted to direct the slide 41 in a path which preferably extends substantially radially of the center of the hollow shaft 33 about which the body portion of the head pivots. The upper end of the slide 41 is provided with a roller 43 which engages the periphery of a cam 44 mounted on the shaft 45 extending from the plate 39. The cam 44 is fixed to rotate with the gear 46 in mesh with the spindle driving gear 26.

The lower end of the slide 41 is bifurcated and a pin 47 having a roller 48 thereon extends between the legs of the slide 41. The slide is drilled from the bottom to receive a spring 49 which is held in place by a plunger 50 supported on the projection 51 of the gear plate 39. The spring 49 thus maintains the roller 43 of the slide 41 in contact with the periphery of the cam 44 at all times. The cam is shaped to gradually force the slide 41 downwardly against the action of the spring 49 during most of one rotation thereof and then to permit the spring 49 to suddenly raise it to upper position. Thus for each rotation of the cam 44 the slide goes from upper position to lower position and returns again to upper position.

A thrust member 52 having a flat surface 53 is mounted on a pin 54 extending between the spaced arms 55 of the support 56. The thrust member 52 is adjustable on the pin 54 and may be fixed in any desired position by tightening the bolt 57 threaded onto the end of the pin 54 to clamp the thrust member 52 between the arms 55. The adjustment of the thrust member may be facilitated by an outwardly projecting screw 58. The support 56 is provided with a shaft 59 positioned in the pillow block 60 and is adjustable therein about the axis of the shaft 59. The set screw 61 maintains the shaft 59 in desired position.

With the construction above described, rotation of the gear 26 by the motor 29 causes rotation of the gear 46 and cam 44, the latter forcing the slide 41 downwardly. The spring 36 in the hollow shaft 33 maintains the roller 48 of the slide in contact with the flat surface 53 of the thrust member 52. Consequently, if the flat surface 53 is at an angle to the direction of movement of the slide 41, longitudinal movement will be imparted to the body portion 12 and the head 11. As the gear 26 which drives the spindle also drives the gear 46, the head 11 will be reciprocated longitudinally in timed relation with the rotation of the spindle 14 and the implement 16 carried thereby. When a cam such as cam 44 is employed, the ratio between the number of teeth in the gears 26 and 46 is equal to the number of flutes in the implement to be ground or otherwise treated.

Figure 3:
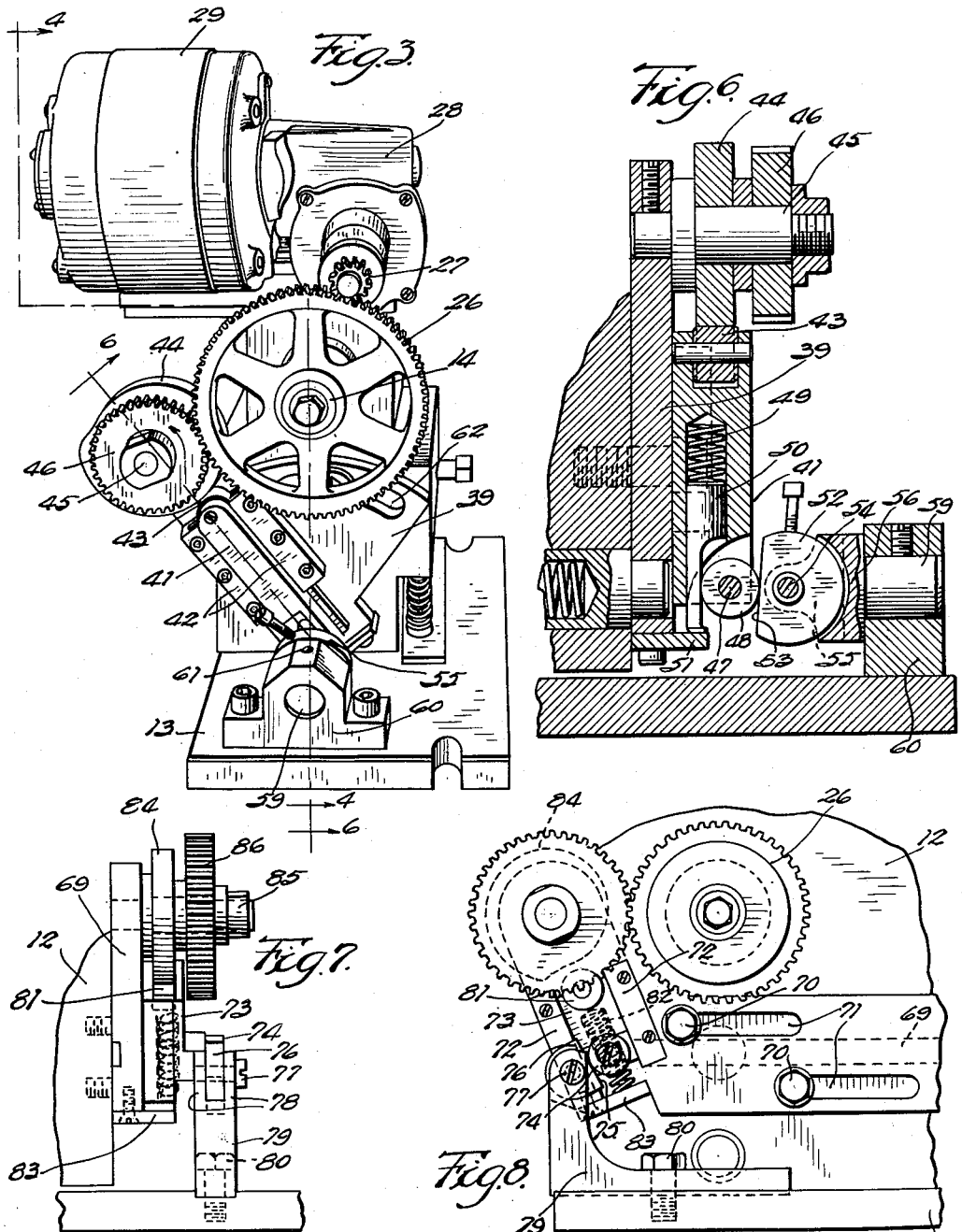
Fig. 3 is a perspective view of one end of the fixture showing the driving means for producing longitudinal movement.

When it is desired to change the ratio between gears 26 and 46 the gears may be replaced. If a larger gear is to be employed on the shaft 45, the gear plate 39 is pivoted about the end 34 of shaft 33 to the left as shown in Fig. 3, thereby moving the shaft 45 away from the spindle 14. To permit sufficient pivotal movement, plate 39 is provided with an arcuate slot 62 through which the screw 40 extends. Thus, by loosening the screw 40, the gear plate 39 may be pivoted in any direction and then held as desired upon tightening of the screw 40. It is also possible to vary the reciprocation of the slide 41 by employing a different shaped cam 44.

Figure 2:
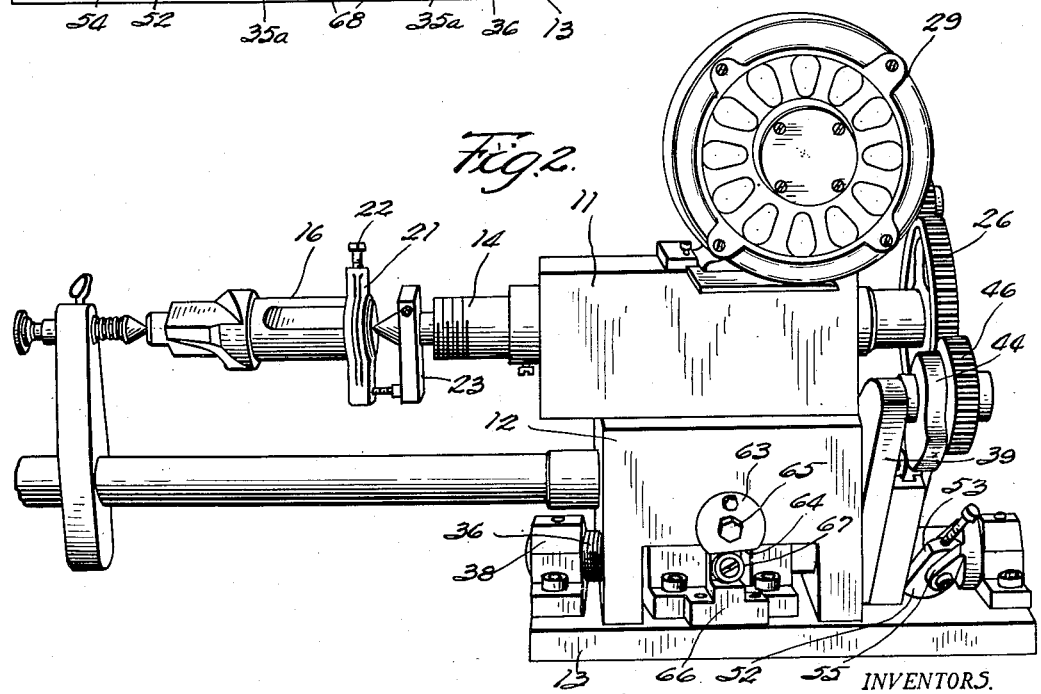
Fig. 2 is a rear perspective view of the fixture.
Figure 5:
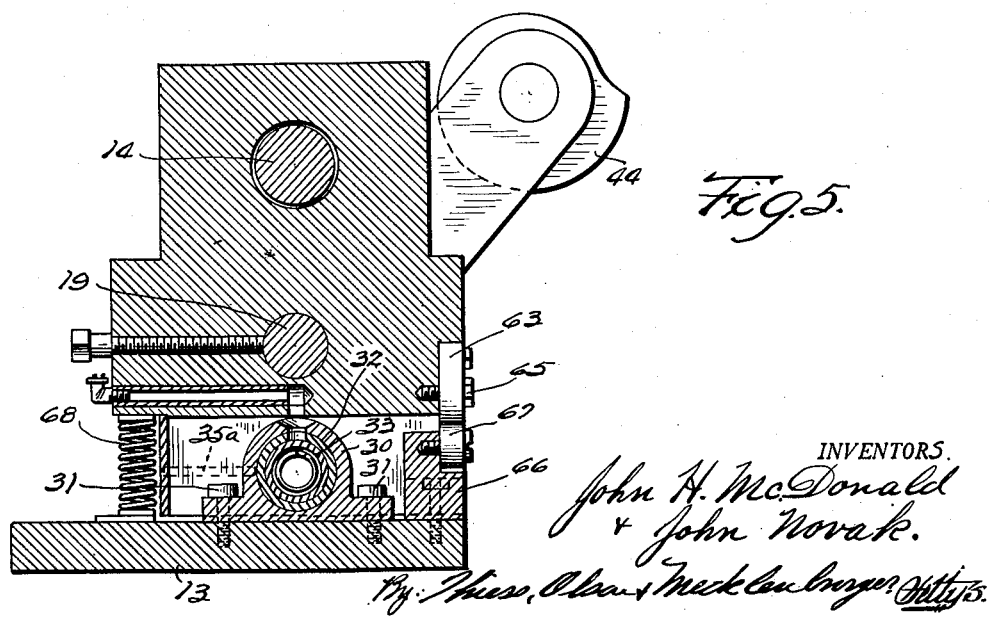
Fig. 5 is a central vertical cross sectional view taken along the lines 5—5 of Fig. 4.

Longitudinal movement of the head 11 and the body portion 12 also results in a pivoting or rocking movement of the head and body members about the shaft 33. One means of accomplishing this is illustrated particularly in Figs. 2 and 5. A member 63, similar to the thrust member 52, is mounted on the rear of the body portion 12 and, like the thrust member 52, is provided with a flat surface 64. The member 63 pivots on a screw 65 threaded into the body portion 12 and may be adjusted thereabout to alter the position of the flat surface 64. A bracket 66 positioned at the rear of the base 13 has rotatably mounted thereon a roller 67 positioned to engage the flat surface 64 of the member 63. Compression springs 68 positioned between an overhanging portion of the main body portion 12 and the base 13 tend to force the rear of the body portion 12 downwardly and thus maintain the flat surface 64 in contact with the roller 67 at all times. By arranging the flat surface 64 at an angle to the horizontal, the head and body members 11 and 12 will be caused to pivot or rock when they are moved longitudinally as previously described.

The extent or amplitude of the movement of the head and body members is controlled by the adjustment of the flat surfaces 53 and 64 of the members 52 and 63. The more nearly surface 53 is at right angles to the path of movement of the slide 41 the greater the longitudinal movement of the head 11 will be. Likewise the greater the deviation of the flat surface 64 from the horizontal, the greater will be the pivotal or rocking movement of the head for any adjustment of the surface 53.

The grinding wheel may be positioned with respect to the fixture as shown in Fig. 1. In this position with the flat surfaces 53 and 64 arranged as illustrated in the drawings, the tool 16 in contact with the grinding wheel will move with a somewhat spiral motion resulting in both radial and longitudinal relief four times for each revolution of the spindle 14. If it is desired to increase either the radial or the longitudinal relief without affecting the other, this may be done by adjusting respectively the members 63 and 52. Thus, the fixture can be adjusted to provide the exact longitudinal and radial relief desired for any grinding operation.

When the fixture is to be used to provide radial relief only, the modification shown in Figs. 7 and 8 is employed. Before the attachment shown in Figs. 7 and 8 is secured in position, the gear plate 39 with the parts supported thereby is removed. Also the pillow block 60 and the parts mounted thereon are removed from the base 13. The plate 39 is replaced by a plate 69 secured to the body portion 12 by screws 70 which pass through horizontal slots 71 and thread into the body portion 12. Loosening of the screws 70 permits horizontal adjustment of the plate 69. Mounted on the plate 69 are guides 72 in which a slide 73 reciprocates. A roller 74 mounted on the outer side of the slide 73 engages the flat surface 75 of a thrust member 76 similar to the thrust member 52. The thrust member 76 is adjustably mounted on a pin 77 extending between the spaced arms 78 of bracket 79. The bracket 79 is provided with a longitudinal slot through which the bolt 80 extends and threads into the base 13 thereby adjustably securing the bracket on the base 13.

A roller 81 is mounted on the upper end of the slide 73. A spring 82 is positioned in the space provided therefor in the slide 73. The lower end of the spring is supported on the shelf 83 secured to the bottom of the plate 69. This construction tends to maintain the slide 73 in upper position at all times.

The roller 81 on the slide 73 contacts the periphery of cam 84 mounted on shaft 85 extending from the plate 69. A gear 86 for meshing with the gear 26 on the end of the spindle 14 is connected to the cam 84 so that the gear and cam rotate together. Due to the shape of the cam 84, rotation of the gears 26 and 86 causes reciprocation of the slide 73. Whenever the flat surface 75 of the thrust member 76 is at an angle to the direction of movement of the slide 73, the head and body members 11 and 12 will be caused to pivot about the shaft 33 of the fixture thereby providing radial relief alone.

By reversing either of the cams 44 or 84 the machine may be altered from the arrangement shown, designed for supporting implements having a right hand cut, to a machine for supporting for treatment implements having a left hand cut.

With fixtures of the foregoing type, any desirable radial and longitudinal relief may be provided simply by altering the adjustment of the members 52, 63 and 76. This can be done easily and quickly. Moreover, each of these members can be adjusted independently of the other.

While particular relieving fixtures have been shown and described, it is to be understood that various changes and modifications may be made therein without departing from the present invention and therefore, we wish to be limited only by the appended claims.

We claim:

1. A fixture comprising a work supporting head having means including a spindle for supporting work to be treated and rotating it with said spindle, means for rotating said spindle, a base, said head being mounted on said base for longitudinal movement and for pivotal movement about an axis longitudinal of said head, actuating means coordinated with said spindle for longitudinally reciprocating said head and returning it to initial position at least once for each rotation of said spindle, said actuating means being adjustable to vary the amplitude of said reciprocating movement, and means actuated by the longitudinal reciprocation of said head for effecting rocking of said head about said axis longitudinal thereof.

2. A fixture comprising a work supporting head member having means including a spindle for supporting work to be treated and rotating it with said spindle, means for continuously rotating said spindle, a base member, said head being mounted on said base for longitudinal movement and for pivotal movement about an axis longitudinal of said head, means for causing longitudinal reciprocation of said head member comprising an actuating element carried by one of said members and reciprocated in timed relation with said spindle driving means in a plane substantially normal to the longitudinal axis of said head and an actuated element having a straight bearing portion mounted on said other member for engagement by said actuating element, said actuated element being adjustable about an axis at right angles to the path of movement of said actuating element to vary the angularity of said bearing portion to said actuating element, and adjustable means actuated by the longitudinal reciprocation of said head for effecting rocking of said head about said longitudinal axis.

3. A fixture comprising a work supporting head having means including a spindle for supporting work to be treated and rotating it with said spindle, means for continuously rotating said spindle, a base, said head being mounted on said base for longitudinal movement and for pivotal movement about an axis longitudinal of said head, a slide mounted on said head for reciprocation in a path substantially normal to said longitudinal axis of said head, means coordinated with said spindle driving means for causing reciprocation of said slide in timed relation to the rotation of said spindle, an actuated element having a straight bearing portion mounted on said base with said bearing portion positioned for engagement by said slide, said actuated element being adjustable about an axis at right angles to the path of said reciprocating slide to vary the angularity of said straight bearing portion to said slide, and adjustable means actuated by the longitudinal reciprocation of said head for effecting rocking of said head about said longitudinal axis.

4. A fixture comprising a work supporting head having a work spindle therein, means for rotating said spindle, a base, said head being mounted on said base for longitudinal movement and for pivotal movement about an axis longitudinal of said head, actuating mechanism correlated with the rotation of said spindle for effecting longitudinal reciprocation of said work head and its return to initial position at least once for each rotation of said spindle, and adjustable means actuated by the longitudinal reciprocation of said head for effecting rocking of said head about said longitudinal axis.

5. A fixture comprising a work supporting head member, a spindle rotatably mounted in said head member and arranged longitudinally thereof, means for continuously rotating said spindle, a base member, said head being mounted on said base member for longitudinal movement and for pivotal movement about an axis longitudinal of said head, means for causing longitudinal reciprocation of said head member with respect to said base comprising an actuating element carried by one of said members and reciprocated in timed relation with said spindle driving means in a plane substantially normal to the longitudinal axis of said head, an actuated element having a straight bearing portion mounted on said other member for engagement by said actuating element, said actuated element being adjustable about an axis substantially at right angles to the path of movement of said actuating element to vary the angularity of said bearing portion to said actuating element, resilient means for maintaining said actuating and actuated elements in contact, and means on said head and base members for effecting rocking of said head about said longitudinal axis during longitudinal reciprocation of said head, said last means comprising a tilting element having a straight bearing portion mounted on one of said members and a bearing portion mounted on said other member for engagement with said straight bearing portion during longitudinal movement of said head, said tilting element being adjustable about an axis substantially normal to the direction of longitudinal movement of said head to vary the angularity of the straight bearing portion thereon to said bearing element.

6. A fixture comprising a work supporting head member, a spindle rotatably mounted in said head member and arranged longitudinally thereof, means for continuously rotating said spindle, a base member, said head being mounted on said base for longitudinal movement and for pivotal movement about an axis longitudinal of said head, means for causing longitudinal reciprocation of said head member on said base member comprising an actuating element carried by said head member and reciprocated in timed relation with said spindle driving means in a plane substantially normal to the longitudinal axis of said head, and an actuated element having a straight bearing portion fixedly mounted with respect to said base member for engagement by said actuating element, said actuated element being adjustable about an axis substantially at right angles to the path of movement of said actuating element to vary the angularity of said bearing portion to said actuating element and control the amplitude of longitudinal movement of said head member, resilient means for maintaining said actuating and actuated elements in contact, and means on said head and base members for effecting rocking of said head about said longitudinal axis during longitudinal reciprocation of said head, said last means comprising a tilting element having a straight bearing portion mounted on one of said members and a bearing portion mounted on said other member for engagement with said straight bearing portion during longitudinal movement of said head, said tilting element being adjustable about an axis substantially normal to the direction of longitudinal movement of said head to vary the angularity thereof to said bearing element.

7. A fixture comprising a work supporting head member, a spindle rotatably mounted in said head member and arranged longitudinally thereof, means for continuously rotating said spindle, a base member, said head being mounted on said base for longitudinal movement and for pivotal movement about an axis longitudinal of said head, means for causing longitudinal reciprocation of said head member on said base member comprising an actuating element carried by said head member and reciprocated in timed relation with said spindle driving means in a plane substantially normal to the longitudinal axis of said head, and an actuated element having a straight bearing portion fixedly mounted with respect to said base member for engagement by said actuating element, said actuated element being adjustable about an axis substantially at right angles to the path of movement of said actuating element to vary the angularity of said bearing portion to said actuating element and control the amplitude of said longitudinal movement of said head member, resilient means for maintaining said actuating and actuated elements in contact, and means on said head and base members for effecting rocking of said head about said longitudinal axis during longitudinal reciprocation of said head, said last means comprising a tilting element having a straight bearing portion fixedly mounted with respect to said base member and a bearing portion mounted on said head member for engagement with said straight bearing portion during longitudinal movement of said head, said tilting element being adjustable about an axis substantially normal to the direction of longitudinal movement of said head to vary the angularity thereof to said bearing element.

JOHN H. McDONALD.
JOHN NOVAK.

REFERENCES CITED

The following references are of record in the file of this patent:

UNITED STATES PATENTS

| Number | Name | Date |
|---|---|---|
| 1,323,452 | Cogsdill | Dec. 2, 1919 |
| 1,402,473 | Bickford | Jan. 3, 1922 |
| 1,651,432 | Bath et al. | Dec. 6, 1927 |
| 2,099,724 | Cogsdill | Nov. 23, 1937 |
| 2,209,228 | Judge | July 23, 1940 |
| 2,388,064 | Markus | Oct. 30, 1945 |
| 2,413,436 | Dawson | Dec. 31, 1946 |
| 2,436,902 | Rovick | Mar. 2, 1948 |
| 2,442,318 | Weisel | May 25, 1948 |
| 2,445,194 | Umbdenstock | July 13, 1948 |
| 2,445,649 | Turner et al. | July 20, 1948 |
| 2,482,802 | Sanders | Sept. 27, 1949 |
| 2,538,651 | Parker | Jan. 16, 1951 |

FOREIGN PATENTS

| Number | Country | Date |
|---|---|---|
| 26,452 | Great Britain | Nov. 25, 1911 |